(12) United States Patent
Schoner

(10) Patent No.: US 7,847,973 B2
(45) Date of Patent: Dec. 7, 2010

(54) COLOR MAPPING CIRCUIT

(75) Inventor: Brian Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 1010 days.

(21) Appl. No.: 10/825,395

(22) Filed: Apr. 15, 2004

(65) Prior Publication Data
US 2005/0169522 A1 Aug. 4, 2005

Related U.S. Application Data

(60) Provisional application No. 60/540,578, filed on Jan. 30, 2004.

(51) Int. Cl.
*H04N 1/60* (2006.01)
*H04N 9/64* (2006.01)

(52) U.S. Cl. ............... 358/1.9; 358/2.1; 358/515; 358/512; 358/518; 345/593; 345/601; 345/589; 382/167

(58) Field of Classification Search ............ 358/1.9, 358/2.1, 515, 512, 518; 382/167; 345/593, 345/601
See application file for complete search history.

(56) References Cited

U.S. PATENT DOCUMENTS 6,912,071 B1 * 6/2005 Rasmussen et al. ......... 358/406
7,116,441 B1 * 10/2006 Matsuoka .................. 358/1.9

* cited by examiner

*Primary Examiner*—David K Moore
*Assistant Examiner*—Quang N Vo
(74) *Attorney, Agent, or Firm*—McAndrews Held & Malloy, Ltd.

(57) ABSTRACT

A system and method that provide full color mapping of video images with minimal distortion to the image. A two-dimensional look up table may be used to map a certain number of colors, and for colors that are not represented by entries in the table, the four closest entries to the desired color may be interpolated to provide mapping for the color, thus achieving full color mapping. The method may also provide the ability to map colors in partial bypass and full bypass conditions. In a full bypass condition the color goes through the system unchanged, and the system may be capable of mapping the brightness of the color by interpolating the luminance values of the closest table entries.

24 Claims, 2 Drawing Sheets

COLOR MAPPING CIRCUIT

RELATED APPLICATIONS

This patent application makes reference to, claims priority to and claims benefit from U.S. Provisional Patent Application Ser. No. 60/540,578, entitled "Color Mapping Circuit," filed on Jan. 30, 2004, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In the field of video and image processing, it is sometimes desirable to alter or modify the colors of the images. Some color modifications may be in the form of mapping one color to another, or adjusting the brightness based on color. Some of the applications of color mapping include, for example, flesh-tone adjustment wherein colors "near" flesh may be mapped to correct flesh hue. Green-stretch is another application by which the saturation of green (or any other color) may be increased. Green-boost is another application by which the value of green (or any other color) may be increased. Green-bright is an application by which the brightness of green (or any other color) may be increased. Saturation is an application by which the saturation of all colors may be increased. The hue application allows the hue of a color to be adjusted.

A video or image pixel may typically be represented as a 24-bit value. There are several variations of pixel representations such as, for example, 24-bit RGB, 24-bit $YC_rC_b$, and 24-bit YUV. Other variations may utilize more or less than 24 bits. In some systems a color-mapping table may be used to map the colors in an original image to the desired corresponding colors in a new image. In some color-mapping applications, a full color-mapping table may require 48 megabytes of storage, which may be impractical in systems with low-cost implementations. Typically, personal computers use color palettes, which are implemented as look up tables with entries constituting the mapping for colors. The problem with such systems is that they take an input and find the nearest possible color to map to in the look up table, so each input color does not have a unique color to be mapped to, and hence full color mapping cannot be done. Furthermore, using such color palettes can cause distortions to the images.

Some simple systems use RGB color schemes, where each pixel is represented by a red (R), green (G), and blue (B) component. A one-dimensional table represents each of the components, with fixed values being used for mapping the red, green, or blue component to a different intensity. The problem with such systems is that if, for example, a pixel is purple and it needs to be mapped to a different color, then the red and blue components need to be mapped to different red and blue components to get a new purple. However, the problem with doing so is that it will also affect the red and blue pixels, and other pixels with colors that have the same red and blue components as the purple pixel.

Additionally, existing color-mapping methods do not provide the ability to change the brightness of the color in addition to the color mapping. The two functions usually have to be performed separately.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that maps any input color from an image to an output color using two-dimensional lookup table and color information associated with the input color from the image, wherein the lookup table contains the mapping for a portion of the colors of the image. The method comprises determining mapping information for table entries nearest to the input color, and interpolating the mapping information for the nearest table entries to obtain color information for an output color corresponding to the input color. Determining mapping information for the nearest table entries comprises determining mapping information of the four closest table entries to the input color, where the input color is located between the nearest table entries. When the input color is near an edge of the look up table, two or one nearest table entries are used.

The mapping information of a table entry comprises color information associated with the table entry and a mapping condition associated with the table entry. The mapping condition indicates that the color information associated with the table entry is to be used when the mapping condition is asserted, and that the color information of the input color is to be used when the mapping condition is not asserted. The color information of the input color is output without performing any mapping when the mapping condition is not asserted for all the nearest table entries, in which case, the brightness of the input color may be mapped to an output brightness using the brightness information of each of the nearest table entries.

The system comprises at least one processor capable of performing the method that maps any input color from an image to an output color using two-dimensional lookup table and color information associated with the input color from the image.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate to a method and system that map colors of images with minimal distortion in a video or image processing system. An embodiment of the present invention may map any color to any other color, thus achieving full color mapping, using a cost-effective implementation. Each pixel of an image may be represented using the luminance value Y, the red chrominance value $C_r$, and the blue chrominance value $C_b$. Although the following discussion describes an embodiment of the present invention using a $YC_rC_b$ representation, it should be understood that other pixel representations may be used in other embodiments of the present invention.

Figure 1:
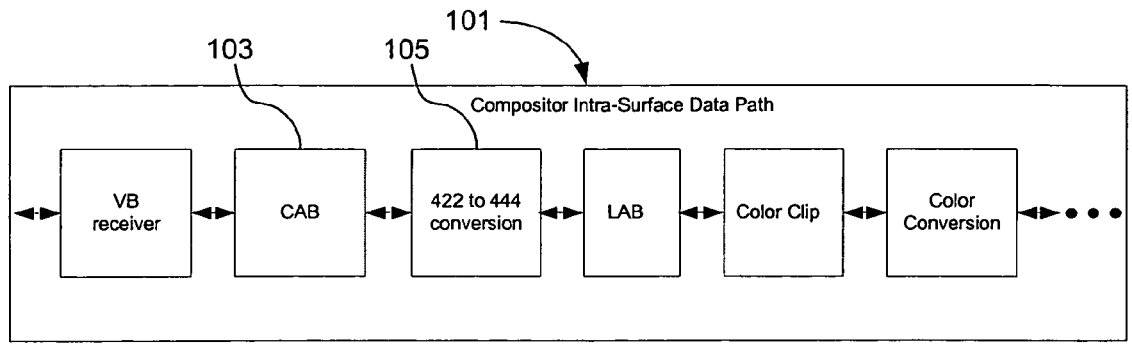
FIG. 1 illustrates a block diagram of an exemplary system utilizing a color adjustment block, in accordance with an embodiment of the present invention.

FIG. 1 illustrates a block diagram of an exemplary system 101 utilizing a color adjustment block (CAB) 103, in accordance with an embodiment of the present invention. The CAB 103 may be utilized in a system 101, and may be associated with a video display in the system 101. The system 101 may comprise other components such as, for example, the block 105 that performs 4:2:2 to 4:4:4 conversions. The CAB 103 may operate before the block 105 in the system 101 to reduce hardware cost. The architecture of the CAB 103 may be based on a two-dimensional [Cr, Cb] lookup table (LUT). The LUT may be utilized for 2-dimensional linear interpolation, which may result in a table of a fairly small size such as, for example, 1024×17 bits. The two-dimensional LUT may have one direction or axis representing the Cr component of the pixels, and the other direction or axis representing the Cb component of the pixels. The CAB 103 may be programmable by a user to provide control over color adjustments by allowing the user to program the LUT. The LUT may be programmed into a memory unit (not shown) in the system 101, and a processor (not shown) may read from and written to the LUT.

An input color may fully bypass the LUT if the color does not need to be changed, thus there would be no need for mapping. In a full bypass situation, the input color may not get distorted by passing through the system, and the color at the output may be the same as the color at the input. An input color may also be fully mapped by the system; in such a case, the input color may be mapped to a completely new color at the output. In an embodiment of the present invention, partial bypass conditions may be allowed. The LUT may provide both color-mapping and luminance-mapping functions. Full and partial bypass are further explained hereinafter.

Figure 2:
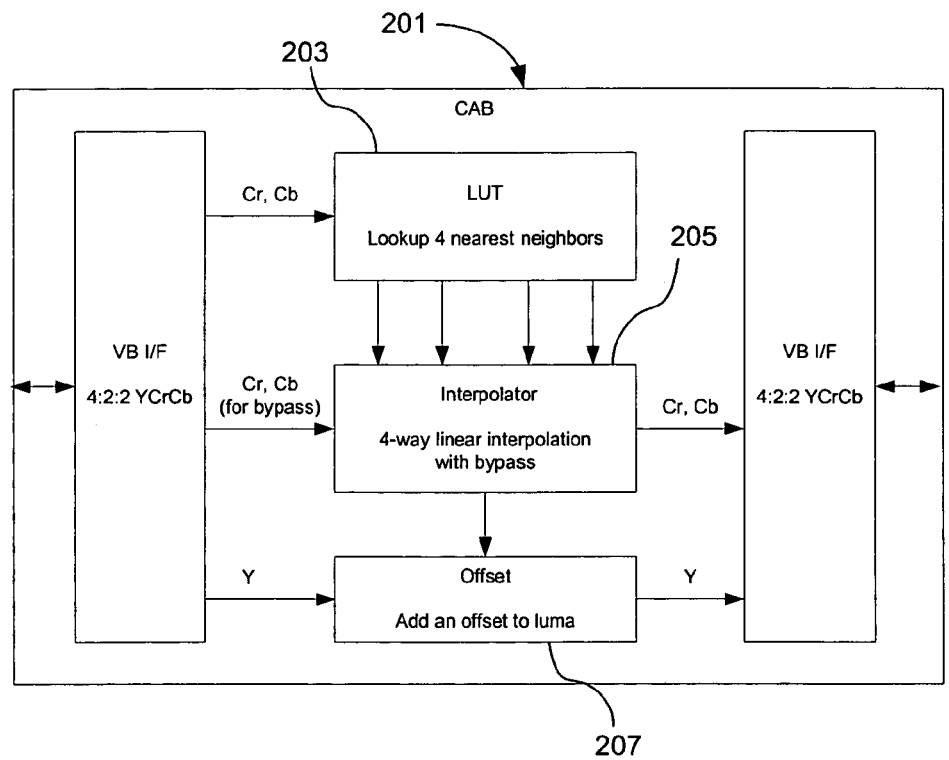
FIG. 2 illustrates an exemplary block diagram of a color adjustment block, in accordance with an embodiment of the present invention.

FIG. 2 illustrates an exemplary block diagram of a CAB 201, in accordance with an embodiment of the present invention. The CAB 201 may be similar to the CAB block 103 of the system 101 of FIG. 1. The CAB 201 may comprise several functions such as, for example, a LUT function 203, an interpolator 205, and a luminance-offset function 207.

The LUT function 203 may receive as an input a $[C_r, C_b]$ pair representing an input color. The LUT function 203 may search the LUT and locate the four table entries closest to the input $[C_r, C_b]$ pair. The LUT function 203 may then output the four $[C_r, C_b]$ pairs in the four located closest table entries. The output of the LUT function 203 may then be input into the interpolator 205. The interpolator 205 may then interpolate the four closest $[C_r, C_b]$ pairs to determine the output $[C_r, C_b]$ pair corresponding to the input $[C_r, C_b]$ pair. The luminance value associated with the input $[C_r, C_b]$ pair may be the input to the luminance-offset function 207, which may add to the input luminance a luminance offset value. The LUT function 203 may also provide a luminance-offset value associated with the input $[C_r, C_b]$ pair. The luminance offset may be averaged to compensate for 4:2:2 to 4:4:4 conversion.

In an embodiment of the present invention, a full bypass may be required for a certain input $[C_r, C_b]$ pair. In such an embodiment, the input pair may be directly sent to the interpolator 205, thus bypassing the LUT function 203. The output $[C_r, C_b]$ pair may then be outputted, wherein the output pair is equivalent to the input $[C_r, C_b]$ pair.

Figure 3:
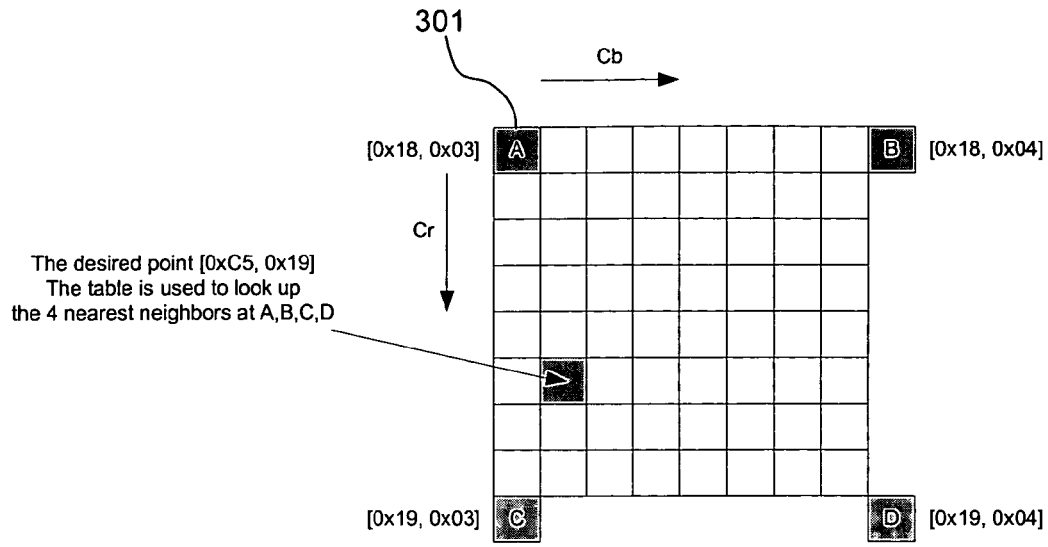
FIG. 3 illustrates an exemplary color adjustment block lookup, in accordance with an embodiment of the present invention.

FIG. 3 illustrates an exemplary CAB lookup table, in accordance with an embodiment of the present invention. For example, using the aforementioned table of size 1024×17, each entry in the table contains a $[C_r, C_b]$ pair. The $[C_r, C_b]$ values may be represented by 17 bits, and each of $C_r$ and $C_b$ may be represented by 8 bits and hence may have values in the range 0-255, and the $17^{th}$ bit may indicate the bypass condition. As mentioned above, the LUT may be a two-dimensional table, with one axis representing the $C_r$ values and the other axis representing the $C_b$ values. For an input $[C_r, C_b]$ pair the corresponding pixel in the LUT may contain the values of the corresponding output $[C_r, C_b]$ pair. For many input $[C_r, C_b]$ pairs, the LUT may not contain a corresponding output $[C_r, C_b]$ pair, and instead the LUT function may search the LUT for the four closest entries, and use the $[C_r, C_b]$ pairs at the closest entries to determine by interpolation the value of the desired output $[C_r, C_b]$ pair. For example, if an input pixel has the values $[Y\ C_r\ C_b]$=[50, 197, 25]=[0x32, 0xC5, 0x19], the 5 most significant bits (MSbs) of the $C_r$ and $C_b$ values may be used for table lookup. Using the 5 MSbs yields a table with 1024 entries. In another embodiment of the present invention, more MSbs may be used for the LUT, which may yield a larger table that may provide more values, and may require more memory, for example, using the 6 MSbs yields a table with 4096 entries, four times the amount of memory needed for a LUT based on the 5 MSbs. In another embodiment of the present invention, less MSbs may be used for the LUT, which may yield a smaller table with 256 entries, if for example 4 MSbs are used, hence less memory is used, but less colors are represented by the table. The user may program the system according to the needs and resources of the system.

The 5 MSbs (most significant bits) of $C_r$ and $C_b$ are, in the example above, [0x18, 0x03] and are concatenated to provide an index of the table entry in the LUT for location "A" in FIG. 3. The LUT function may also determine the values for the indexes of the entries for points B, C, and D, which may be in addition to location A, the four closest locations to the desired point. At each location A, B, C, and D, the LUT may contain a 16-bit value representing a new (mapped) $[C_r, C_b]$ pair and a $17^{th}$ bit for bypass.

In an illustrative embodiment of the invention, suppose that the contents of the LUT at locations A, B, C, and D are [190, 22], [192, 29], [200, 20], and [204, 32], respectively. Linear interpolation may then be performed in every direction, for both the $C_r$ and $C_b$ values, using the 3 LSbs (least significant bits) of the original 8-bit $C_r$ and $C_b$ values from which the 5 MSbs were used to determine the location. In this example, the 3 LSbs are [5, 1]. Accordingly, the results for the linear interpolation would then be:

```
CR1 = 190 * 8 + 1 * (192 – 190) = 1522        // average A & B
CR2 = 200 * 8 + 1 * (204 – 200) = 1604        // average C & D
CR3 = 1522 * 8 + 5 * (1604 – 1522) = 12586    // average the two results
CR = (12586 + 32)/64 = 197                    // round the remainder
CB1 = 22 * 8 + 1 * (29 – 22) = 183
CB2 = 20 * 8 + 1 * (32 – 20) = 172
CB3 = 183 * 8 + 5 * (172 – 183) = 1409
CB = (1409 + 32)/64 = 23
```

Thus the final output of the example here would be $[C_r, C_b]$=[197, 23]. In this example the input color is fully mapped, thus yielding a new color.

In an embodiment of the present invention, the LUT function may receive the 5 MSbs of $C_r$ and $C_b$ as inputs. The LUT function may then provide the locations of the four closest table entries as an output. If the input were the catenation of [$C_r$ 5MSb, $C_b$ 5MSb], to get the four closest entries the LUT function looks up:

| | |
|---|---|
| [$C_r$ 5MSb, $C_b$ 5MSb] (the original 10-bit address) | // A |
| [$C_r$ 5MSb, $C_b$ 5MSb] + 1 | // B |
| [$C_r$ 5MSb, $C_b$ 5MSb] + 32 | // C |
| [$C_r$ 5MSb, $C_b$ 5MSb] + 33 | // D |

The 5-bit additions (+1, +32, +33) for lookups B, C, and D, respectively, may be performed independently for $C_r$ 5MSb and $C_b$ 5MSb. There may be no carry between the 5 LSbs and 5 MSbs, and the 5-bit additions may saturate on the 5-bit boundaries. As a result, an input pair may correspond to a location in the table close to an edge. In such a situation, there may not be four closest table entries, but instead two closest table entries, or one closest table entry.

In another instance, the input pair may fall on a table entry, in which case, the input may be mapped directly to the table entry to which it corresponds.

In an embodiment of the present invention, the entries of the LUT may each be 17 bits [0-16]. The MSb, bit 16, may indicate bypass, the next 8 MSbs, bits 8-15, may indicate the $C_r$ value, and the 8 LSbs, bits 0-7, of the LUT output may indicate the $C_b$ value. If the 17$^{th}$ bit, which may be referred to as the bypass bit, is set, this may indicate bypass of the [$C_r$, $C_b$] pair with which it is associated. In instances where all four entries are bypassed, this may be referred to as a "full bypass" condition. If 1, 2, or 3 of the 4 entries are bypassed, this may be referred to as a "partial bypass" condition.

In instances where the bypass bit is set for all four entries closest to the input pair, then there is a full bypass condition, and the input [Cr, Cb] goes through the system unchanged, where the output pair is the same as the input pair. In instances where the bypass bit is asserted for a portion of the entries closest to the input pair, there is a partial bypass condition, and the output may be calculated in a manner, which may be somewhat similar to that which is indicated above. However, for each pair for which the bypass bit is asserted, a shifted index of the corresponding LUT entry is used instead of the values in that LUT entry. As indicated above, the index of a LUT entry of one of the closest LUT entries to the input pixel, is the pair of 5 MSbs of the Cr value and the 5 MSbs of the Cb value of the input, plus whatever shift needed to get that index (+0, +1, +32, or +33). This may be further illustrated by the example below using the same data as the example above.

For example, if an input pixel has the values [Y $C_r$, $C_b$]=[50, 197, 25]=[0x32, 0xC5, 0x19], the 5 MSbs are [0x18, 0x03] and are concatenated to provide an index of the LUT entry for location "A" in FIG. 3. The LUT function may then determine the values for the indexes for locations B, C, and D, which with A are the four nearest LUT entries to the desired point. At each location A, B, C, and D, the LUT may contain a 17-bit value representing a mapped [$C_r$, $C_b$] pair with 8-bits for each, and a 17$^{th}$ bit for bypass. For this example, let B and D have the bypass bit asserted, thus indicating the mapped [$C_r$, $C_b$] pair values in the B and D locations need be bypassed. For illustrative purposes, suppose that the contents of the LUT for points A, B, C, and D are [190, 22], [192, 29], [200, 20], and [204, 32], respectively. However, for points B and D, the values [3<<0x18, 3<<0x04] and [3<<0x19, 3<<0x03] should be used, respectively, yielding the pair B=[192, 32] D=[200, 24]. Linear interpolation may then be performed in every direction, for both the $C_r$ and $C_b$ values, using the 3 LSbs (least significant bits) of the original $C_r$ and $C_b$ values. In this example, the 3 LSbs are [5, 1]. The results for the linear interpolation would then be:

| | |
|---|---|
| CR1 = 190 * 8 + 1 * (192 − 190) = 1522 | // average A & B |
| CR2 = 200 * 8 + 1 * (200 − 200) = 1600 | // average C & D |
| CR3 = 1522 * 8 + 5 * (1600 − 1522) = 12566 | // average the two results |
| CR = (12566 + 32)/64 = 196 | // round the remainder |
| CB1 = 22 * 8 + 1 * (32 − 22) = 186 | |
| CB2 = 20 * 8 + 1 * (24 − 20) = 164 | |
| CB3 = 186 * 8 + 5 * (164 − 186) = 1378 | |
| CB = (1378 + 32)/64 = 22 | |

Thus the final output of this example would be [$C_r$, $C_b$]=[196, 22]. In this example, the input color was mapped using partial bypass, which had some effect on the color and yielded a slightly different result from mapping the same color with full mapping.

In certain instances, there may be an input for which the system may need to perform full bypass, and as a result the chrominance values may not change, and thus, the color of the input may not change. In such instances, whenever there may be a full bypass condition, the four nearest LUT entries may be used to determine a luminance offset. The luminance offset may affect the brightness of the input, but not the color. Accordingly, for any input color, the chrominance or color may change, or the luminance or brightness may change. The system may be adapted to map the color of the input, and in the case of a full bypass the system may map the brightness of the input. The system may also be adapted to map the color and the brightness of any input pixel.

Figure 4:
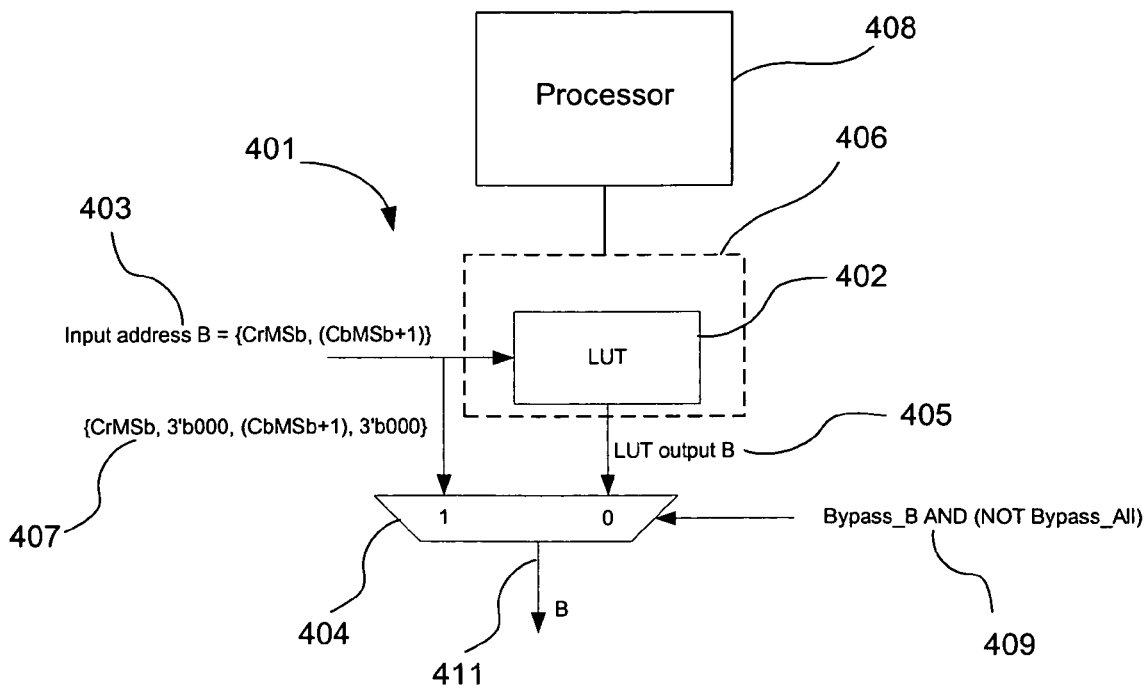
FIG. 4 illustrates an exemplary block diagram of the circuitry for partial bypass, in accordance with an embodiment of the present invention.

FIG. 4 illustrates an exemplary block diagram of the circuitry 401 for partial bypass, in accordance with an embodiment of the present invention. The circuitry 401 may determine the partial bypass condition for each of the locations closest to the input pixel. In operation, the circuitry 401 may have as an input 403 the index for the location of one of the four (one or two) locations closest to the input in the LUT such as, for example, the location B. The input 403 may then be shifted left by 3 and zero padded to obtain a [$C_r$, $C_b$] pair 407 of 8 bits each. The input 403 indicating the index of a location in the LUT may then be used to read from the LUT 402 the contents at that location, which is also a mapped [$C_r$, $C_b$] pair 405. The [$C_r$, $C_b$] pair 407 and the mapped [$C_r$, $C_b$] pair 405 may then be input into a MUX 404, which has the bypass bit of location B as a control input 409. When the bypass bit is not asserted, the output 411 of the MUX 404 is the mapped [$C_r$, $C_b$] pair 405. Otherwise, when the bypass bit is asserted, the output 411 of the MUX 404 is the [$C_r$, $C_b$] pair 407, thus bypassing the mapped [$C_r$, $C_b$] pair 405. Each of the 4 lookups (A, B, C, D) goes through the circuitry of FIG. 4 to determine partial bypass. The input 403 is shown for location B, and should be consistent with the lookup for each of the 4 lookups using the appropriate increment values for each location.

In an embodiment of the present invention, the LUT 402 may be stored in a memory unit 406. A processor 408 may be connected to the memory unit 406.

In an embodiment of the present invention, if only a portion of the outputs read from the LUT have the "bypass" bit asserted, the interpolator 205 of FIG. 2 may interpolate as usual. If all 4 outputs read from the LUT have the "bypass" signal asserted, the CAB may output the original $C_r$ and $C_b$ values without any modification.

In an embodiment of the present invention, if all 4 outputs read from the LUT have the "bypass" signal asserted and a full bypass condition may be indicated, the interpolator 205 may not calculate chrominance values and the color may remain the same as the input color. The interpolator 205, in the full bypass condition may be used to calculate a luminance offset value. The luminance-offset values may be encoded as the 8 LSbs of the LUT outputs (the "Cb" values). The interpolator 205 may interpolate the outputs read from the LUT as described hereinabove, but the "Cb" output may be sent to the luminance-offset block.

Full bypass may not be asserted, and as such, the interpolator 205 may send a value such as, for example, 8'h80 to the luminance-offset block, which may be used as the value for zero luminance adjustment. The luminance Y of a pixel may be calculated according to the following equation:

$$Y_{new} = Y_{old} + \text{luminance\_offset} - 128$$

Hence, if the luminance_offset were equal to 128 then $Y_{new}=Y_{old}$ and there would be no change in Y. In an embodiment of the present invention, the interpolator 205 may be adapted to compute the luminance_offset for every other pixel, because interpolation may be performed in the 4:2:2 environment, where $C_r$ and $C_b$ are horizontally sub-sampled by a scale of 2 with respect to Y. The luminance_offset may be applied directly for co-located luminance pixels, and may be averaged between neighboring pixels for non-co-located luminance pixels. If edge conditions exist, the closest value may be replicated.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that maps any input color from an image to an output color, the method using a two-dimensional lookup table that contains mapping for a portion of the colors of the image and using color information associated with an input color from the image, the method comprising:
    determining mapping information for table entries nearest to an input color; and
    interpolating, performed by a processor, the mapping information for the nearest table entries to obtain color information for an output color corresponding to the input color, wherein interpolating said mapping information for the nearest table entries comprises:
        determining mapping information of a first table entry corresponding to a color represented by the lookup table and closest to the input color;
        determining mapping information of a second table entry a table entry away from the first table entry in a first direction in the lookup table;
        determining mapping information of a third table entry a table entry away from the first table entry in a second direction in the lookup table;
        determining mapping information of a fourth table entry a table entry away from the third table entry in a first direction in the lookup table; and
        wherein the input color is located between the nearest table entries.

2. The method according to claim 1 wherein the mapping information of a table entry comprises color information associated with the table entry and a mapping condition associated with the table entry.

3. The method according to claim 2 wherein the mapping condition indicates whether the color information associated with the table entry is to be used when the mapping condition is asserted.

4. The method according to claim 3 wherein the mapping condition indicates whether the color information of the input color is to be used when the mapping condition is not asserted.

5. The method according to claim 4 wherein the color information of the input color is output without performing any mapping when the mapping condition is not asserted.

6. The method according to claim 5 wherein the brightness of the input color is mapped to an output brightness using brightness information of the table entries when the color information of the input color is output without performing any mapping.

7. The method according to claim 1 wherein the four nearest table entries are used to map the color of the input color.

8. The method according to claim 1 wherein two or one nearest table entries are used to map the color of the input color when the input color is near an edge of the look up table.

9. A system that maps any input color from an image to an output color, the system comprising:
    a two-dimensional lookup table that contains mapping for a portion of the colors of the image; and
    at least one processor capable of determining mapping information for table entries nearest to an input color, the at least one processor capable of interpolating the mapping information for the nearest table entries to obtain color information for an output color corresponding to the input color, wherein determining mapping information for the nearest table entries comprises:
    determining mapping information of a first table entry corresponding to a color represented by the lookup table and closest to the input color;
    determining mapping information of a second table entry a table entry away from the first table entry in a first direction in the lookup table;
    determining mapping information of a third table entry a table entry away from the first table entry in a second direction in the lookup table;
    determining mapping information of a fourth table entry a table entry away from the third table entry in a first direction in the lookup table; and
    wherein the input color is located between the nearest table entries.

10. The system according to claim 9 wherein the mapping information of a table entry comprises color information associated with the table entry and a mapping condition associated with the table entry.

11. The system according to claim 10 wherein the mapping condition indicates the color information associated with the table entry is to be used when the mapping condition is asserted.

12. The system according to claim 11 wherein the mapping condition indicates the color information of the input color is to be used when the mapping condition is not asserted.

13. The system according to claim 12 wherein the color information of the input color is output without performing any mapping when the mapping condition is not asserted for all the nearest table entries.

14. The system according to claim 13 wherein the brightness of the input color is mapped to an output brightness when the color information of the input color is output without performing any mapping.

15. The system according to claim 9 wherein the four nearest table entries are used to map the color of the input color.

16. The system according to claim 9 wherein two or one nearest table entries are used to map the color of the input color when the input color is near an edge of the look up table.

17. A non-transitory computer-readable medium having stored thereon, a computer program having at least one code section that maps any input color from an image to an output color using a two-dimensional lookup table that contains mapping for a portion of the colors of the image and using color information associated with an input color from the image, the at least one code section being executable by a computer for causing the computer to perform steps comprising:

determining mapping information for table entries nearest to an input color; and interpolating the mapping information for the nearest table entries to obtain color information for an output color corresponding to the input color; and wherein the code for determining mapping information for the nearest table entries comprises:

code for determining mapping information of a first table entry corresponding to a color represented by the lookup table and closest to the input color;

code for determining mapping information of a second table entry a table entry away from the first table entry in a first direction in the lookup table;

code for determining mapping information of a third table entry a table entry away from the first table entry in a second direction in the lookup table;

code for determining mapping information of a fourth table entry a table entry away from the third table entry in a first direction in the lookup table; and wherein the input color is located between the nearest table entries.

18. The non-transitory computer-readable medium according to claim 17 wherein the mapping information of a table entry comprises color information associated with the table entry and a mapping condition associated with the table entry.

19. The non-transitory computer-readable medium according to claim 18 wherein the mapping condition indicates the color information associated with the table entry is to be used when the mapping condition is asserted.

20. The non-transitory computer-readable medium according to claim 19 wherein the mapping condition indicates the color information of the input color is to be used when the mapping condition is not asserted.

21. The non-transitory computer-readable medium according to claim 20 wherein the color information of the input color is output without performing any mapping when the mapping condition is not asserted for all the nearest table entries.

22. The non-transitory computer-readable medium according to claim 21 wherein the brightness of the input color is mapped to an output brightness using brightness information of the table entries when the color information of the input color is output without performing any mapping.

23. The non-transitory computer-readable medium according to claim 17 wherein the four nearest table entries are used to map the color of the input color.

24. The non-transitory computer-readable medium according to claim 17 wherein two or one nearest table entries are used to map the color of the input color when the input color is near an edge of the look up table.

* * * * *